United States Patent
Miyata et al.

(10) Patent No.: US 7,960,884 B2
(45) Date of Patent: Jun. 14, 2011

(54) AXIAL GAP TYPE ROTATING MACHINE

(75) Inventors: Koji Miyata, Tokyo (JP); Naoki Watanabe, Tokyo (JP); Masakatsu Honshima, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 94 days.

(21) Appl. No.: 12/441,864

(22) PCT Filed: Jun. 27, 2008

(86) PCT No.: PCT/JP2008/061707
§ 371 (c)(1),
(2), (4) Date: Mar. 18, 2009

(87) PCT Pub. No.: WO2009/001917
PCT Pub. Date: Dec. 31, 2008

(65) Prior Publication Data
US 2010/0072850 A1  Mar. 25, 2010

(30) Foreign Application Priority Data

Jun. 28, 2007 (JP) .................. 2007-170122
Oct. 24, 2007 (JP) .................. 2007-276338

(51) Int. Cl.
*H02K 21/12* (2006.01)
*H02K 37/00* (2006.01)
*H02K 5/00* (2006.01)
*H02K 16/00* (2006.01)
*H02K 1/22* (2006.01)

(52) U.S. Cl. .................. 310/156.12; 310/49.05; 310/91; 310/114; 310/156.32; 310/268

(58) Field of Classification Search .............. 310/61–64, 310/49.05, 90.5, 91, 156.12, 156.32, 268, 310/114

See application file for complete search history.

(56) References Cited

U.S. PATENT DOCUMENTS
4,874,976 A * 10/1989 Ohsawa et al. ............... 310/268
(Continued)

FOREIGN PATENT DOCUMENTS
EP  1 850 451 A1  10/2007
(Continued)

OTHER PUBLICATIONS
Machine Translation JP2001-037122 (2001).*
(Continued)

*Primary Examiner* — Quyen Leung
*Assistant Examiner* — Jose A Gonzalez Quinones
(74) *Attorney, Agent, or Firm* — Roberts Mlotkowski Safran & Cole, P.C.; David S. Safran (57) ABSTRACT

An axial gap rotating machine rigidly fixing permanent magnets without reducing magnetic flux and having a high output has: a housing; a rotating shaft rotatably supported in the housing; two rotors having disks rotatably integral with the rotating shaft, and permanent magnets arranged concentrically in spaced relation to each other on at least one side of surfaces of the rotating disks in spaced relation to each other on at least one side of surfaces of the rotating disks in spaced relation to each other; and a stator arranged between the rotors, spaced from the rotors and fixed to the housing, the stator having a plurality of coils disposed concentrically around the rotating shaft spaced from each other; wherein magnetic flux generated from the permanent magnets of the rotors intermittently penetrates the interior of each of the coils as the shaft rotates, wherein the rotating disk has a concave portion in the surface facing the stator in which the permanent magnets are disposed so as to protrude.

8 Claims, 11 Drawing Sheets

U.S. PATENT DOCUMENTS

| | | |
|---|---|---|
| 6,445,105 B1 * | 9/2002 | Kliman et al. ............... 310/268 |
| 6,531,799 B1 * | 3/2003 | Miller .......................... 310/114 |
| 2005/0099081 A1 | 5/2005 | Obidniak |
| 2006/0138890 A1 | 6/2006 | Kato |

FOREIGN PATENT DOCUMENTS

| | | | |
|---|---|---|---|
| JP | 8-126277 A | | 5/1996 |
| JP | 10-164779 A | | 6/1998 |
| JP | 2001037122 A | * | 2/2001 |
| JP | 2003-348805 A | | 12/2003 |
| JP | 2006-14399 A | | 1/2006 |
| JP | 2006-25573 A | | 1/2006 |
| JP | 2006-174554 A | | 6/2006 |
| WO | 2006/077812 A1 | | 7/2006 |

OTHER PUBLICATIONS

International Search Report for International Application No. PCT/JP2008/061707.

English Translation of the State Intellectual Property Office of China, First Notification of Office Action, Date of Issue Mar. 7, 2011.

* cited by examiner

AXIAL GAP TYPE ROTATING MACHINE

TECHNICAL FIELD

The present invention relates to an axial gap type rotating machine which is a synchronous type permanent magnet rotating machine such as a motor or an electric generator, having its rotors and stators facing each other in the direction of the rotational axis.

BACKGROUND ART

Structures of permanent magnet rotating machines can be classified into the radial gap type and the axial gap type. In the radial gap type, a plurality of permanent magnets are arranged in the circumferential direction of a rotor, the poles of the permanent magnets being radially directed, and a stator is arranged so as to face the permanent magnets. Generally the stator has a structure in which coils are wound on an iron core having a plurality of teeth on the surface facing the rotor. By use of an iron core, magnetic flux from the poles of the rotor can efficiently intersect the coils so as to produce a large torque in the case of a motor and a large voltage in the case of an electric generator. On the other hand, there is a problem that use of an iron core generates cogging torque and loss torque based on the hysteresis loss of the iron core to make the initial torque large. In application to a wind generator, for example, slight wind fails to produce voltage due to a large initial torque.

Figure 9:
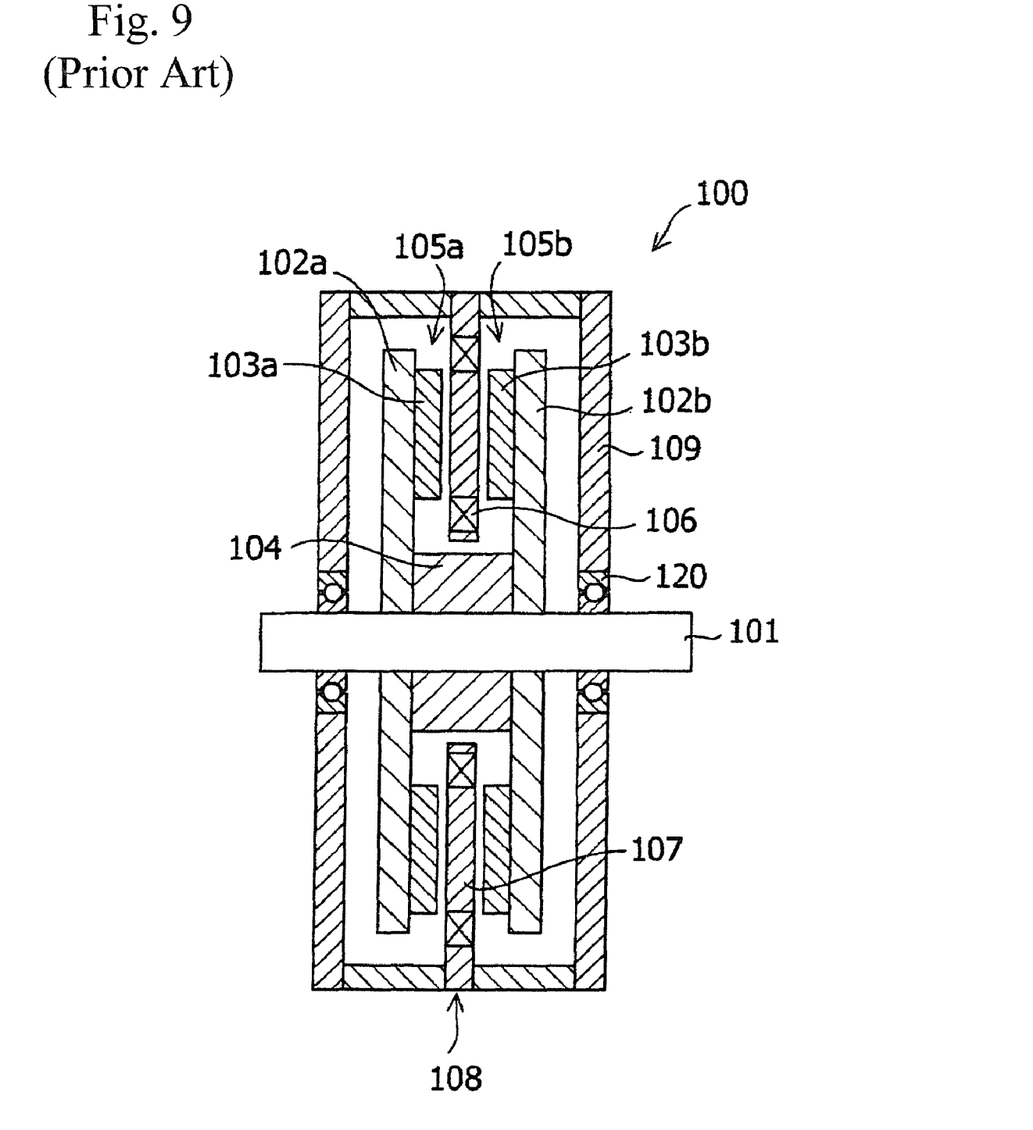
FIG. 9 is a schematic sectional view showing the whole of a conventional axial gap type rotating machine.

Such a problem can be solved by eliminating the iron core, but this lowers the magnetic efficiency so that large output cannot be obtained by the radial gap type. Thus the axial gap type as shown in FIG. 9 can be designed. In FIG. 9, disk-shaped magnetic bodies (rotor yoke) 102a, 102b are integrally attached to a rotating shaft (shaft) 101 and the rotor yokes 102a, 102b each has a plurality of permanent magnets 103 on the surface. The rotor yokes 102a, 102b are arranged in the direction of the rotating shaft through a spacer 104. While the permanent magnets 103 may be arranged on only one of the rotor yokes 102a and 102b, high magnetic efficiency is provided by arranging the permanent magnets (103a, 103b) on the surfaces of both rotor yokes (102a, 102b). These are called rotors (105a, 105b).

Coils 106 are arranged between the rotor yokes (102a, 102b). The coils 106 are accommodated in a coil base 107 to constitute a stator 108 and fixed to a housing 109. The rotating shaft 101 is rotatably supported by the housing 109 through a bearing 120. This structure can provide large output without an iron core in the stator 108 by making the magnetic pole surface large.

In addition, when Nd—Fe—B type sintered magnets are used, which are strong permanent magnets, the rotating machine obtains high output by fully utilizing their performance, being free from the problem of magnetic saturation of an iron core. Generally a rotor has a plurality of permanent magnets attached on the surfaces of disk-shaped magnetic bodies, using epoxy-based or acrylic-based adhesive for bonding, and the magnetic bodies and the magnets are fixed through only one surface as shown in JP2003-348805 A.

In a large rotor the permanent magnets are subject to large centrifugal force during rotation. Further, the temperature of the rotating machine undergoes a heat cycle from the room temperature to a high temperature according to the operating state. In the case of an Nd—Fe—B type sintered magnet, the surface perpendicular to the direction of magnetization, that is, the surface where the magnet is bonded with the magnetic material disk, has a negative coefficient of thermal expansion (shrinks when the temperature rises, $-1.7 \times 10^{-6}$ [1/K]). Soft iron is usually used for the magnetic material disk and it has a positive coefficient of thermal expansion (stretches when the temperature rises, $10 \times 10^{-6}$ [1/K]). Thus the bonding surface is subject to large stress due to the heat cycle. Consequently, there is a problem that breakage occurs in the adhesive and the permanent magnet comes off due to centrifugal force to lose its function.

Patent Document 1: JP2003-348805 A

DISCLOSURE OF THE INVENTION

Problem to Be Solved by the Invention

The object of the present invention is to provide an axial gap type rotating machine rigidly fixing the permanent magnets without reducing the magnetic flux and having a high output.

Means for Solving the Problem

The present inventor has conducted an intensive study to solve the above problem and achieved an axial gap type rotating machine rigidly fixing the permanent magnets and having a high output.

Specifically, the axial gap type rotating machine of the present invention may comprise: a housing; a rotating shaft rotatably supported in the housing; a rotor comprising a rotating disk rotatable integrally with the rotating shaft as the central axis, and permanent magnets arranged on at least one side of the surface of the rotating disk; and a stator that is fixed to the housing so as to face the surface of the rotor having the permanent magnets, being spaced therefrom, and wherein stator coils are arranged concentrically in spaced relation to each other; wherein magnetic flux generated from the permanent magnets of the rotor intermittently penetrates the interiors of the coils disposed concentrically as it rotates, wherein the rotating disk has a concave portion in the surface facing the stator and the permanent magnets are disposed at the concave portions so as to have protruding portions above the surface of the rotating disk.

The axial gap type rotating machine of the present invention can have the permanent magnets arranged on one side of the rotating disk and further have an end rotating disk arranged spaced from the stator and rotatable integrally with the rotating shaft as the central axis.

The axial gap type rotating machine of the present invention can have the permanent magnets arranged on both sides of the rotating disk and further have end rotating disks arranged spaced from the stators and rotatable integrally with the rotating shaft as the central axis.

The axial gap type rotating machine of the present invention can have a concave portion formed at the surface of the end rotating disk facing the stator on the circumference of a circle opposite to the circumference of the concentric circle on which the coils of the stator are arranged, and wherein the permanent magnets are disposed at the concave portions so as to have protruding portions protruding above the surface of the end rotating disk.

The axial gap type rotating machine of the present invention comprising: a housing; a rotating shaft rotatably supported in the housing; two rotors having rotating disks rotatable integrally with the rotating shaft as the central axis, and permanent magnets arranged concentrically in spaced relation to each other on at least one side of the circular surface of the rotating disks, wherein the surfaces having the permanent magnets face each other in spaced relation to each other; and a stator arranged between the rotors facing each other, being spaced therefrom, and the stator having a plurality of coils disposed concentrically in spaced relation to each other; wherein magnetic flux generated from the permanent magnets of the rotors intermittently penetrates the interiors of the coils disposed concentrically as the rotating shaft rotates, wherein the rotating disk has concave portions at the surface facing the stator and the permanent magnets are disposed at the concave portions so as to have protruding portions above the surface of the rotating disk.

Additionally, in the axial gap type rotating machine of the present invention, the protruding portion of the permanent magnet may be preferably ¼ to ¾ of the thickness of the magnet.

Additionally, in the axial gap type rotating machine of the present invention, preferably a reinforcing member non-magnetic material may be provided on the surface of the rotating disk or the end rotating disk so as to support the side surface of the protruding portion of the permanent magnet, the reinforcing member being made of a non-magnetic material and having a through-hole provided corresponding to the position of the permanent magnet disposed at any said rotating disk.

Additionally, in the axial gap type rotating machine of the present invention, a disk-shaped magnetic body piece may be suitable for the rotating disk or the end rotating disk.

Effect of the Invention

According to the present invention, an axial gap type rotating machine can rigidly hold the magnets on the rotor yoke under the condition of centrifugal force and heat cycle operation and without reducing the magnetic flux.

EXPLANATIONS OF LETTERS AND NUMERALS

10 axial gap type rotating machine
100 conventional rotating machine
11, 101 rotating shaft
12, 12*a*, 12*b*, 12*c*, 102*a*, 102*b* rotating plate
13, 13*a*, 13*b*, 13*c*, 13*d*, 103*a*, 103*b* permanent magnet
14, 104 spacer
15, 15*a*, 15*b*, 15*c*, 105*a*, 105*b* rotor
16, 106 coil
17, 107 coil base
18, 18*a*, 18*b*, 108 stator
19, 109 housing
20, 120 bearing
21 concave portion of rotor yoke
22 magnetic material
23 non-magnetic material
110 winding direction

BEST MODE FOR CARRYING OUT THE INVENTION

The present invention will be described in more detail below with reference to the drawings.

Figure 1:
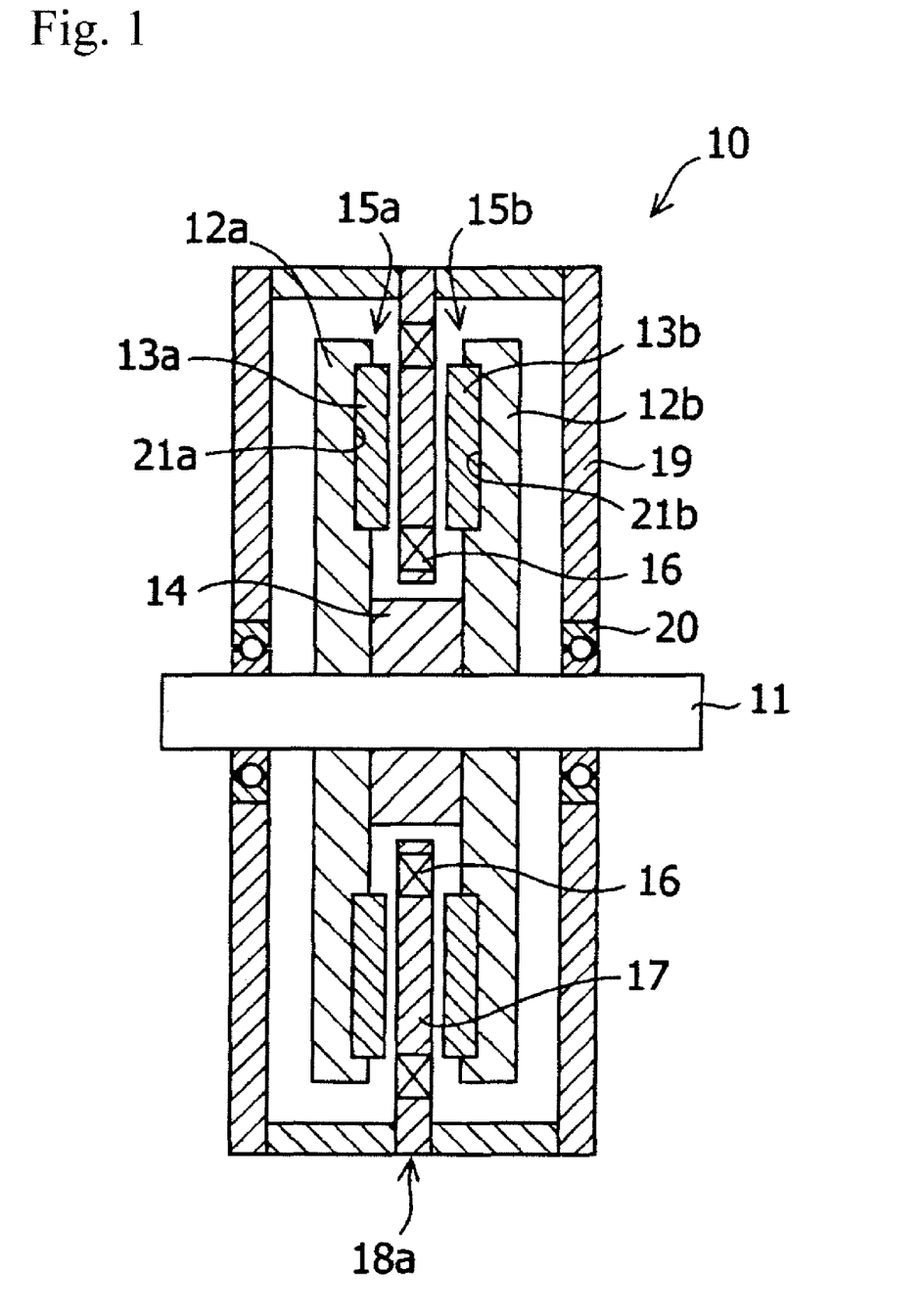
FIG. 1 is a schematic sectional view showing an aspect of the whole of an axial gap type rotating machine of the present invention.

An aspect of a rotating machine of the present invention is shown in FIG. 1.

In a rotating machine 10 of FIG. 1, a rotating disk (rotor yoke) 12*a* is attached to a rotating shaft (shaft) 11 and a permanent magnet 13*a* is arranged on the surface of the rotor yoke to form a rotor 15*a*. A plurality of rotor yokes is arranged through a spacer 14 in the direction of the rotating shaft. Also on the surface of another rotor yoke 12*b* is arranged a permanent magnet 13*b* to form a rotor 15*b*. The surfaces of the rotors 15*a*, 15*b* having the permanent magnets face each other. An even number (at least two) of magnets is installed in the rotor yoke such that the poles are directed in the thickness direction (with respect to the yoke) with the directions of adjacent magnets opposite.

In the gap between the rotor yokes 12*a*, 12*b* is arranged a stator 18*a* comprising a coil 16 and a coil base 17 on the circumference of a circle centered on the rotational axis, and the stator 18*a* can be fixed to a housing 19 (resin). Alternatively the coil 16 may be fixed directly to the housing 19 without the coil base 17. This is a coreless type stator with a bearing 20 between the housing 19 and the rotating shaft 11. The number of the concentrically-arranged coils 16 with respect to the number of the poles is 1:1 in the case of a single phase; in the case of a three-phase alternating current, 4:3, 2:3, 8:9, 10:9, 10:12, 12:15, 16:9, 20:12 and the like can be adopted. In the case of a single phase, preferably adjacent coils are wound in opposite directions and they are connected in series. In the case of three phases, preferably a three-phase winding is made by three sets of serial connection of every third coils in the circumferential direction.

The rotating machine 10 of FIG. 1 differs from the conventional example shown in FIG. 9 in that concave portions 21*a*, 21*b* are formed in the rotor yokes 12*a*, 12*b* and the permanent magnets 13*a*, 13*b* are fitted therein. By providing the concave portion 21 of a desired depth, positioning is facilitated as well as strong adhesion is provided by the large area to which adhesive is applied and a structure is provided in which the permanent magnet is held on its side surface by the rotor yoke 12 so as not to jump out when acted upon by centrifugal force.

Figure 2:
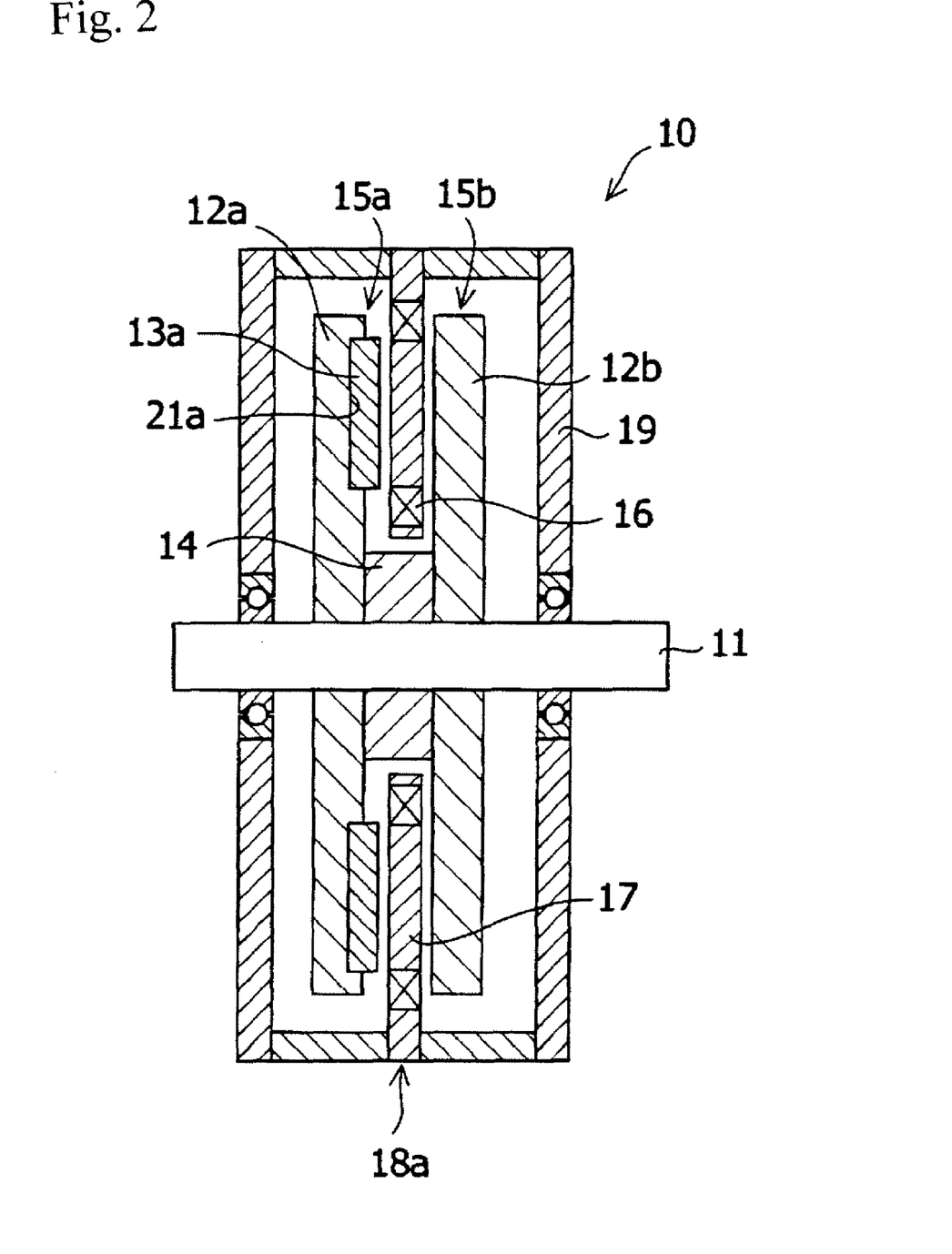
FIG. 2 is a schematic sectional view showing another aspect of the whole of an axial gap type rotating machine of the present invention.
Figure 3:
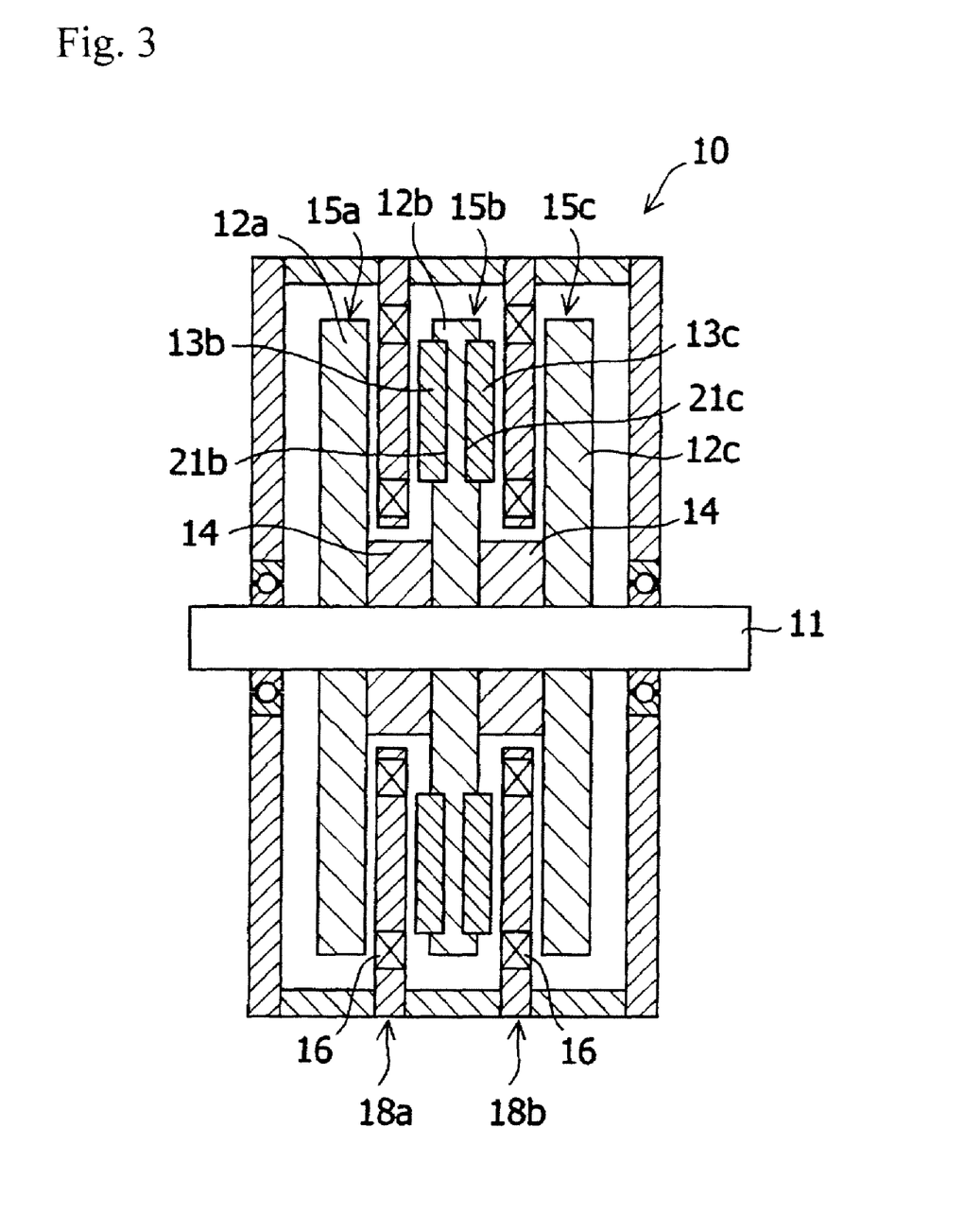
FIG. 3 is a schematic sectional view showing another aspect of the whole of an axial gap type rotating machine of the present invention.
Figure 4:
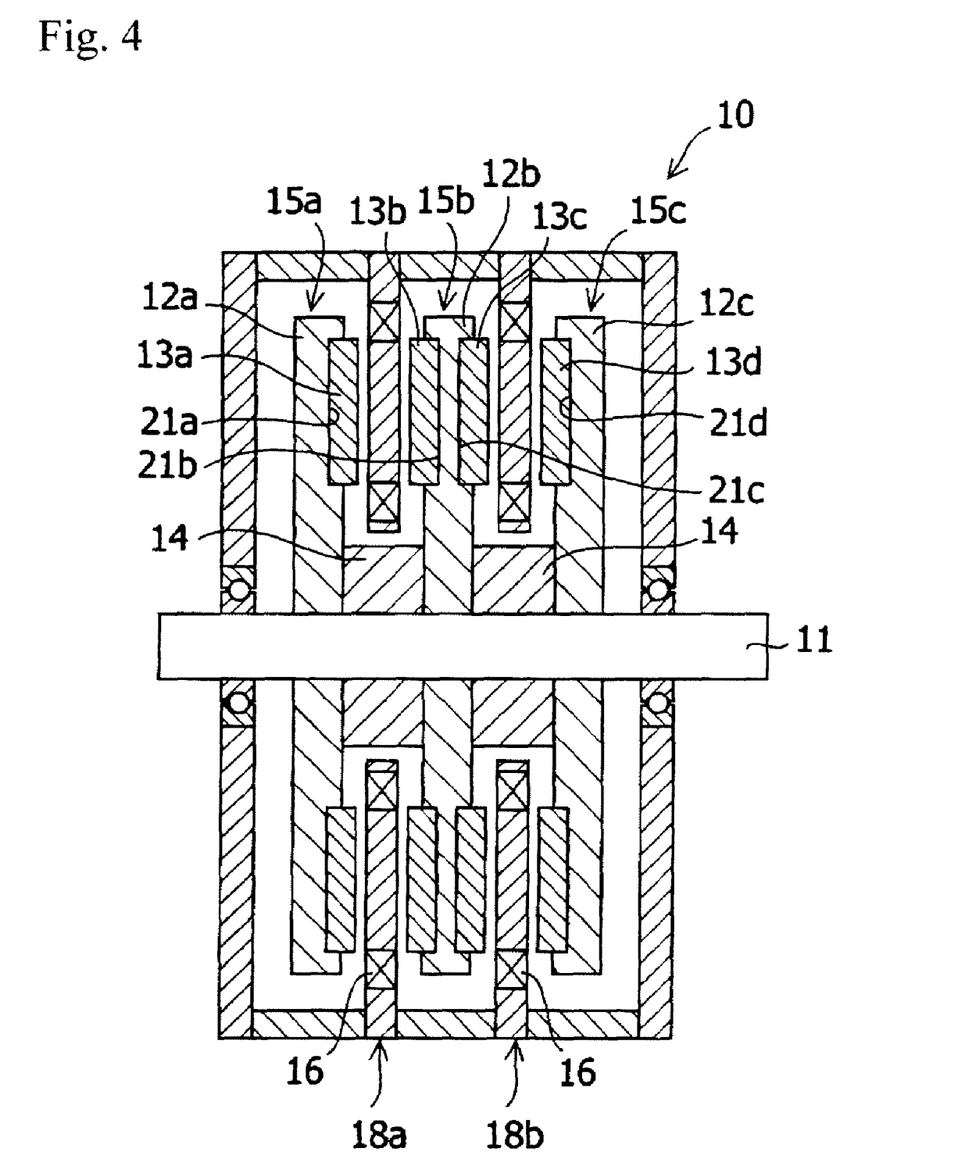
FIG. 4 is a schematic sectional view showing another aspect of the whole of an axial gap type rotating machine of the present invention.

Other aspects of rotating machines of the present invention are shown in FIGS. 2, 3 and 4.

The rotating machine of FIG. 2 differs from the aspect of FIG. 1 in that the same has a structure in which a concave portion 21a is formed in the surface of a rotor yoke 12a facing a stator 18a and a permanent magnet 13a is disposed at the concave portion 21a, while no concave portion is formed and no permanent magnet is disposed at the surface of the other rotor yoke 12b facing the stator 18.

In the rotating machine of FIG. 3, three rotor yokes 12a, 12b, 12c are attached to a rotating shaft (shaft) 11 in the direction of the rotating shaft through a spacer 14. Stators 18a, 18b are disposed between the rotor yokes 12a, 12b and between the rotor yokes 12b, 12c, respectively. The aspect of FIG. 3 differs from the aspect of FIG. 1 in that concave portions 21b, 21c are formed only in both surfaces of the middle rotor yoke 12b and permanent magnets 13b, 13c are fitted therein to form a rotor 15b.

The rotating machine of FIG. 4 differs from the aspect of FIG. 3 in that concave portions 21a, 21d are formed also in the sides of rotor yokes 12a and 12c facing stators 18a, 18c and permanent magnets 13a, 13d are fitted therein.

In the rotating machines of FIG. 3 and FIG. 4, two stators are disposed with a rotor therebetween, in both surfaces of which rotor are formed concave portions at which permanent magnets are disposed. As a matter of course, however, a rotating machine is also included in the present invention which has a so-called sandwich structure in which a rotor having permanent magnets on both surfaces is arranged in each of the gaps formed by arranging three or more stators in spaced relation to each other in a housing.

When a rotating machine of FIG. 3 or FIG. 4 is used as an electric generator, upon transmission of rotational force from a source of power to the rotating shaft, all the rotor yokes rotate synchronously with the rotating shaft and coils in the same position as viewed from the axial direction in the stators arranged in the gaps (gap portion) between the rotors generate voltages in synchronization. Therefore, when these coils are serially connected, the electromotive force of the connected coils is proportional to the number of stages of the stators. In this way, high generation voltage can be readily obtained by increasing the number of stages of the stators as needed.

In the following, the method for arranging and fixing the permanent magnets to the rotor yokes will be described in detail. The reference numerals 12a, 12b and 12c; 13 a, 13b, 13c and 13d; 15a, 15b and 15c; 18a and 18b represent the same thing. Therefore it should be noted that in the following what is described by 12 applies to any of 12a, 12b, 12c, for example.

An adhesive can be used for bonding of the rotor yoke 12 and the permanent magnet 13.

Examples of the adhesive may include an epoxy-based resin and an acrylic-based resin, specifically an elastic and heat-resistant adhesive in order to withstand the heat cycle. Although an adhesive having epoxy resin as a base agent and an adhesive having modified silicone resin as a curing agent were used in the working examples, the adhesive is not limited thereto. The elastic adhesive has elasticity even when cured and functions to absorb stress. Therefore, the surface of the concave portion 21 of the rotor yoke 12 and the surface of the permanent magnet 13 are bonded, the permanent magnet 13 differing according to shape.

The adhesive is applied to the whole surface where the magnet and the rotor yoke contact with each other.

Figure 5:
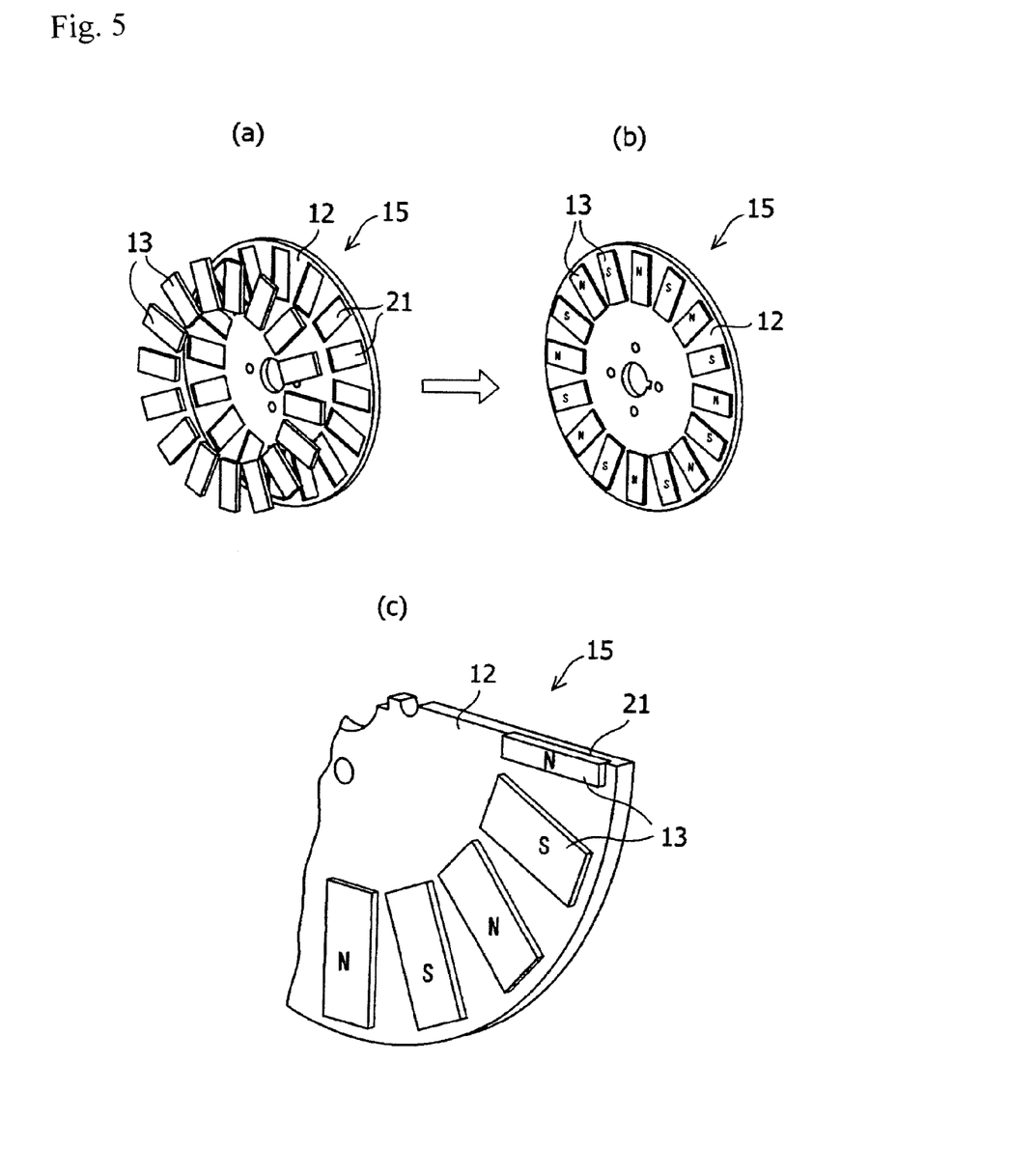
FIG. 5 is (a) a disk made of a magnetic body piece and magnets, (b) a schematic perspective view of a rotor, and (c) an enlarged view in an axial gap type rotating machine of the present invention.

FIG. 5 is a cross sectional view of the rotor 15 with the permanent magnet 13 inserted in the concave portion 21 of the rotor yoke 12. This is characterized in that the permanent magnet 13 protrudes from the surface of the rotor yoke 12; if the permanent magnet were buried entirely, the output would be likely to lower since magnetic flux to the coils would be reduced by short-circuiting from the surface of poles to the rotor yoke. Especially in a rotating machine lacking an iron core, magnetic flux tends to short-circuit because the magnetic field gap is made wide in order to place coils between the magnet and the rotor yoke. Therefore, the present invention has a structure in which the permanent magnet protrudes from the surface of the rotor yoke.

The buried length T2 is preferably ¼ to ¾ of the thickness T1 of the permanent magnet 13.

As for the material of the rotor yokes, the rotating disks either arranged in the end portion or arranged in the inner portion are preferably magnetic and disk-shaped. By using magnetic bodies, magnetic fields between the rotating disks are made strong, magnetic flux generated from the poles is passed back into the yoke, and magnetic flux leaking to the exterior from the rotating disk arranged in the end portion can be reduced.

Figure 7:
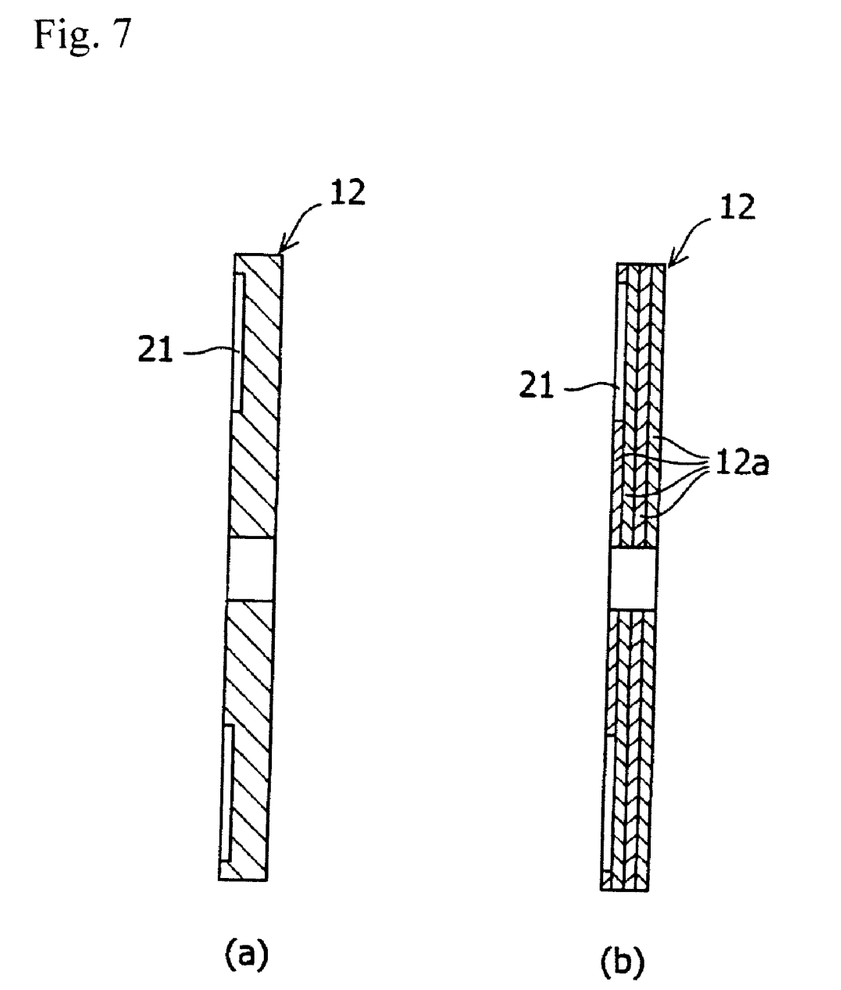
FIG. 7 is a schematic sectional view showing (a) an example, and (b) a variation of a disk made of a magnetic body piece in an axial gap type rotating machine of the present invention.

The rotor yoke may be obtained by, for example, machining low carbon steel such as S15C and S45C as shown in FIG. 7(a). Alternatively, as shown in FIG. 7(b), a plurality of plate members made of cold-rolled steel plates [SPCC], magnetic steel plates or the like are prepared and at least one of them is worked by punching so as to provide a through-hole and is joined with the rest of the plate members provided with no through-hole, a plurality of which are superposed, by caulking or welding, thereby forming a concave portion 21: such a rotor yoke 12 may be used. Here, the above plate members may be either the same material or different materials.

The material of the permanent magnet is not particularly limited and conventionally known one can be used. Preferably it is a high performance rare earth magnet including a rare earth element. A rare earth sintered magnet or rare earth bond magnet comprising a so-called rare earth intermetallic compound is a preferable subject, and more preferably an Nd-based anisotropic sintered magnet is used. In addition, the shape of the permanent magnet used may be a rectangle, a sector or the like.

Figure 8:
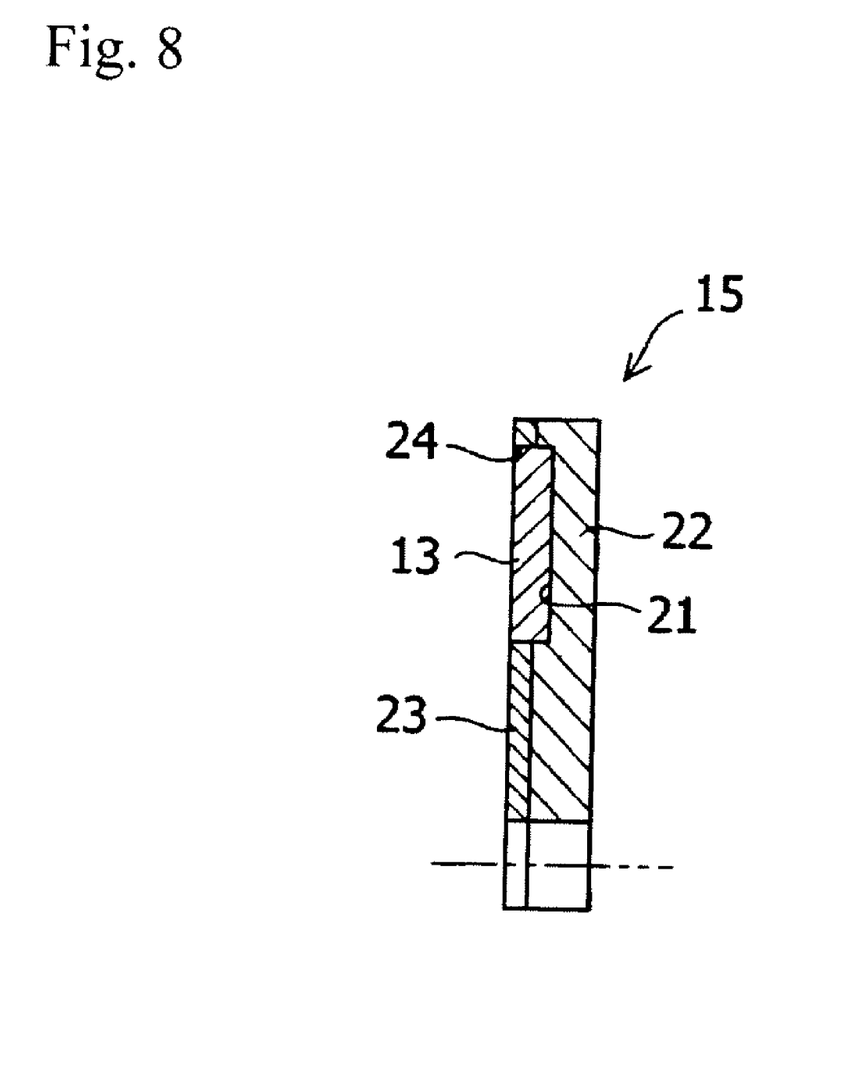
FIG. 8 is a schematic sectional view showing another aspect of a rotor in an axial gap type rotating machine of the present invention.

Thus, as another aspect of the present invention, an aspect is cited in which a reinforcing member made of a non-magnetic material 23 provided with a through-hole 24 corresponding to the position of the permanent magnet disposed at the magnetic body piece and the shape of the section of the rotating shaft is arranged on the surface of a rotor yoke 22 as shown in FIG. 8. As the non-magnetic material 23, aluminum, austenitic stainless steel such as SUS301, SUS302, SUS303, SUS304 and SUS316, and resin such as Bakelite, MC nylon and polyacetal are cited.

Although the above reinforcing member is formed as a disk corresponding to the outer edge shape of the rotor yoke 22 in FIG. 8, it is not particularly limited as long as it is a shape which can reinforce the permanent magnet. In addition, the above reinforcing member may not be formed integrally, and for example a plurality of reinforcing members may be prepared and arranged which are punched in the form of a doughnut corresponding to the shape of the permanent magnet.

The thickness T3 of the above reinforcing member is preferably a thickness such that the surface of the reinforcing member is level with or below the top face of the magnet when the reinforcing member is arranged on the surface of the rotor yoke, and is preferably ⅒ time to ¾ time the thickness T1 of the magnet. Such a reinforcing member and the surface of the rotor yoke can be secured with adhesive or screws. According to such an aspect, the magnetic flux density to the coils can be maintained since short-circuiting does not occur from the surface of the poles to the rotor yoke, and the magnets can be held more firmly.

The revolution speed of the rotating machine of the present invention is not particularly limited, and it can be suitably adopted for operation at 500 rpm to 5000 rpm.

The rotating machine of the present invention can be suitably used for one having a diameter of 0.1 m to 0.5 m.

As for the operating temperature of the present invention, it can be used for operation at 150° C. or more and can also be suitably used for heat cycle operation in the range from 40° C. to 120° C.

EXAMPLES

Embodiments will be described in detail below. The present invention is not limited by the embodiments below. Although an $Nd_2$—$Fe_{14}$—B type permanent magnet will be described, the present invention is not limited to Nd—Fe—B type magnets.

Production Example

Production of a Permanent Magnet

A permanent magnet was fabricated by the following process. Nd, Fe, Co, M (M is Al, Si, Cu) each having a purity of 99.7% by mass and B having a purity of 99.5% by mass were used and an ingot was fabricated by melting and casting in a vacuum melting furnace. This ingot was coarsely crushed by a jaw crusher and further fine powder having an average particle diameter of 3.5 µm was obtained by jet mill crushing in a nitrogen gas stream. This fine powder was filled in a die and formed under a forming pressure of 1.0 t/cm² in a magnetic field of 12 kG by transverse magnetic field press. This compact was subjected to sintering for an hour at 1090° C. in Ar gas, and subsequently subjected to heat treatment for an hour at 580° C. The sintered compact after the heat treatment was in a shape of a rectangular parallelepiped block. This block was subjected to grinding processing by a grindstone to obtain a D-shaped permanent magnet. The properties of the present permanent magnet were Br: 13.0 kG, iHc: 22 kOe, (BH)max: 40 MGOe.

Comparative Example 1

Figure 10:
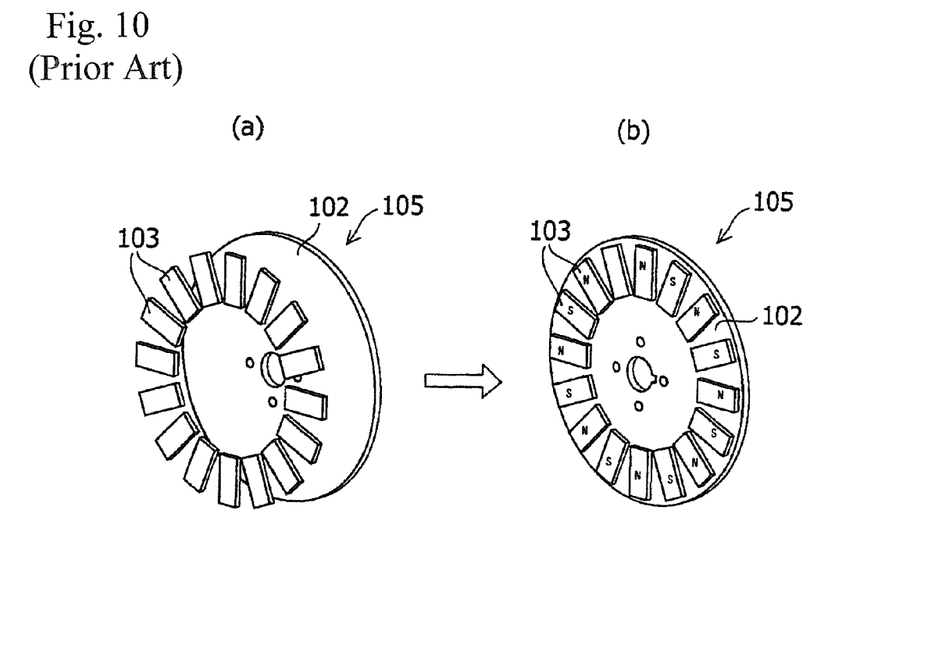
FIG. 10 is a schematic perspective view of (a) a disk made of a magnetic body piece and magnets, and (b) a rotor in a conventional axial gap type rotating machine.
Figure 11:
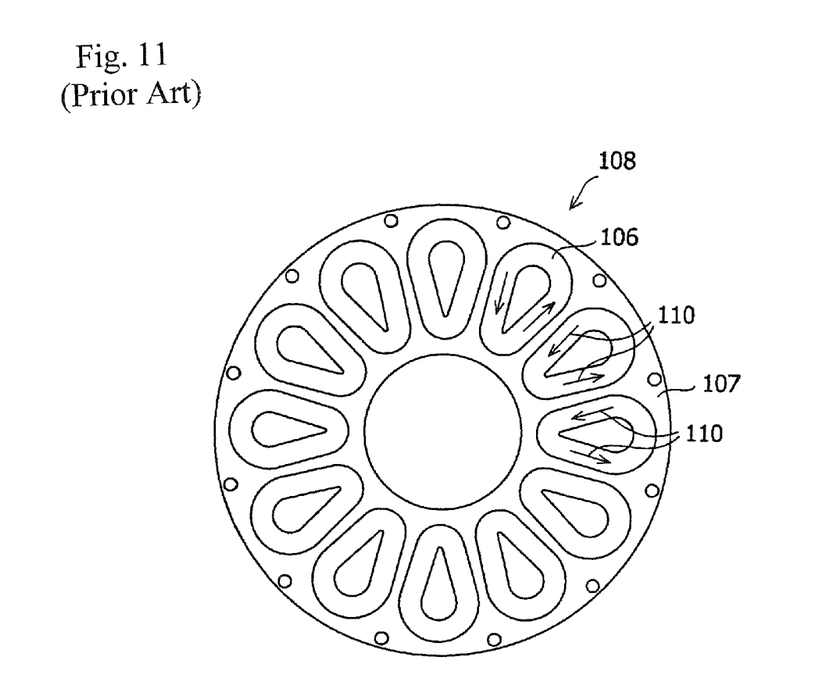
FIG. 11 is a front view of a conventionally used stator.

First, a conventional example is shown as Comparative Example 1 in FIGS. 9, 10 and 11. The structure of the motor was a 16 poles 12 coils motor. FIG. 10 shows permanent magnets 103 being arranged in a rotor yoke 102 to obtain a rotor 105. As the rotor yoke 102, a flat disk made of S15C having an outer diameter of 200 min and a thickness of 5 mm was used. As the permanent magnet 103, one made of the above Nd—Fe—B type magnet sized 20 mm wide, 36 mm long and 4 mm thick in the direction of magnetization was used. Sixteen magnets were arrayed on the surface of the rotor yoke with the pole surfaces being alternately an N pole and an S pole, and bonded by epoxy-based adhesive (EW2040, manufactured by Sumitomo 3 M). The magnets were opposed to magnets 103b of reverse poles with a gap therebetween, as shown in FIG. 9.

The size of the gap was 8 mm and a stator 108 was arranged in the gap.

As for the coils of the stator 108, 12 coils 106 wound 30 turns were accommodated in a coil base 107 made of resin having a thickness of 5 mm such that each of them had a winding direction shown by 110, as shown in FIG. 11. The coils 106 were three-phase connected: four coils were connected in series for each phase and they were connected in star. The coils 106 were fixed to the coil base 107 by the epoxy-based adhesive used in production of the above rotor.

The rotor of the axial gap type rotating machine obtained was rotated at 4000 rpm and used as an electric generator. The effective value of the voltage generated with no load was 207 V. When operated with a load, the rotor had a temperature of 120° C.

Further, when operation was performed intermittently to subject the rotor to temperatures between 20° C. (room temperature) and 120° C. repeatedly, the magnets came off the rotor yoke at the 120th cycle. It is considered that they were scattered because the adhesion strength was lowered by the heat cycle and moreover centrifugal force was applied.

Working Example 1

Figure 6:
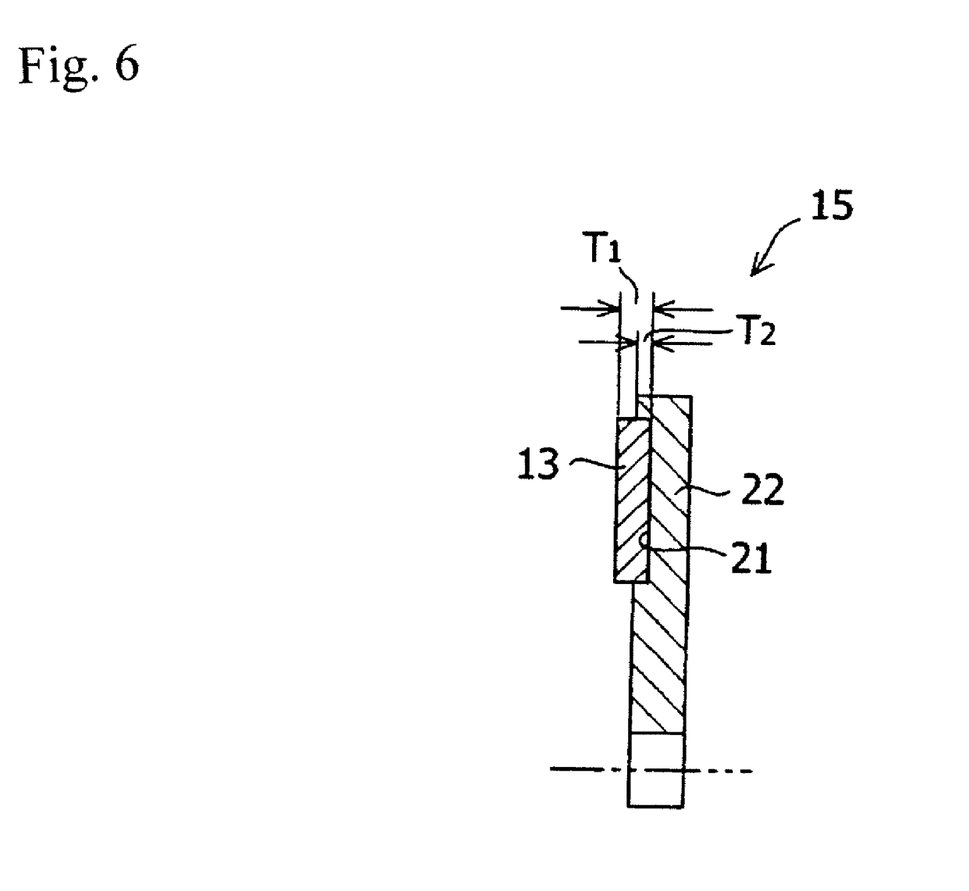
FIG. 6 is a schematic sectional view showing an aspect of a rotor in an axial gap type rotating machine of the present invention.

The configuration of the axial gap type rotating machine of the Embodiment 1 is shown in FIG. 1. The materials and the dimensions were the same as Comparative Example 1 except that the rotor had a structure in which the magnets were disposed at the rotor yoke. As shown in FIG. 5, sixteen magnets 13 were inserted in sixteen concave portions 21 of a rotor yoke 12 formed concentrically in spaced relation to each other, with the pole surfaces being alternately an N pole and an S pole. As shown in FIG. 6, the thickness T1 of the permanent magnet was 4 mm and the fitted length T2 was 2 mm. The magnets 13 and the rotor yoke 12 were bonded by applying elastic adhesive (EP001, manufactured by Cemedine Co., Ltd.) to the side surfaces and the bottom surfaces of the concave portions.

Next, in the same way as Comparative Example 1, the rotor of the axial gap type rotating machine obtained was rotated at 4000 rpm and used as an electric generator. The effective value of the voltage generated with no load was 201 V, which was not significantly different from the comparative example.

Further, when operation was performed intermittently to subject the rotor 15 to temperatures between 20° C. (room temperature) and 120° C. repeatedly, the magnets 13 did not come off the rotor yoke 12 even after 300 or more cycles were performed.

Even when the magnets 13 and the rotor yoke 12 were fixed by the elastic adhesive, the magnets were not scattered.

Comparative Example 2

A rotor for comparison was obtained in the same way as Embodiment 1 except that the magnets were entirely buried in the rotor yoke made of a magnetic material in the rotor. Although the magnets did not come off when the rotor for comparison was repeatedly subjected to temperatures between 20° C. (room temperature) and 120° C., the effective value of the voltage generated with no load upon rotation of the rotor at 4000 rpm was 180 V. This result proved that when the magnets were entirely buried short-circuiting occurs from the pole surface to the rotor yoke to reduce magnetic flux to the coils and lower the output.

It is considered, therefore, that the fitted length T2 is preferably as high as ¼ to ¾ of the thickness T1 of the permanent magnet.

Working Example 2

After a rotor was obtained in the same way as Embodiment 1, a magnet 13 was disposed at the rotor yoke of a magnetic material 22 to the depth of half and further a reinforcing member comprising a non-magnetic material 23 made of SUS304 stainless steel having a through-hole 24 corresponding to the shape of the magnetic 13 was arranged on the surface of the rotor yoke to provide a structure in which the magnet was buried up to its surface by the reinforcing member, as shown in FIG. 8.

In the same way as the Working Example 1, the magnets did not come off when the rotor was repeatedly subjected to temperatures between 20° C. (room temperature) and 120° C., and the effective value of the voltage generated with no load upon rotation of the rotor at 4000 rpm was 201 V, which was the same as the Working Example 1. In addition the magnets were held more firmly than in the Working Example 1 since the magnets were entirely buried.

The invention claimed is:

1. An axial gap type rotating machine comprising:
a housing;
a rotating shaft rotatably supported in the housing;
a rotor comprising a rotating disk rotatable integrally with said rotating shaft around said rotating shaft as a central axis, and permanent magnets arranged on at least one side of a surface of the rotating disk; and
a stator that is fixed to the housing so as to face a surface of said rotor having the permanent magnets, and the stator is spaced from the rotor, wherein stator coils are arranged concentrically around said rotating shaft in spaced relation to each other;
wherein magnetic flux generated from the permanent magnets of said rotor intermittently penetrates interiors of said coils disposed concentrically around said rotating shaft as it rotates,
wherein said rotating disk comprises concave portions formed at a surface facing said stator and the permanent magnets are disposed in the concave portions so as to have protruding portions that protrude above the surface of said rotating disk,
wherein a reinforcing member is provided on a surface of said rotating disk so as to support a side surface of said protruding portions of the permanent magnets, said reinforcing member being made of a non-magnetic material and having a through-hole provided at locations corresponding to the respective locations of the permanent magnets disposed on said rotating disk; and
wherein said reinforcing member has a thickness such that a top surface of the reinforcing member is level with or below a top face of the permanent magnets of the rotating disk which are in the respective through-hole.

2. The axial gap type rotating machine according to claim 1, wherein said permanent magnets are arranged on one side of said rotating disk, and further comprising an end rotating disk arranged spaced from said stator and rotatable integrally with said rotating shaft around said rotating shaft as the central axis.

3. The axial gap type rotating machine according to claim 1, wherein said permanent magnets are arranged on both sides of said rotating disk, and further comprising a plurality of end rotating disks arranged spaced from a plurality of said stators facing a surface of said rotor and rotatable integrally with said rotating shaft around said rotating shaft as the central axis.

4. The axial gap type rotating machine according to claim 2, wherein concave portions are formed on a surface of said end rotating disk facing said stator and on a circumference of a circle opposite to a circumference of the concentric circle on which the coils of said stator are arranged, and wherein the permanent magnets are disposed in the concave portions so as to protrude above the surface of said end rotating disk.

5. An axial gap type rotating machine comprising:
a housing;
a rotating shaft rotatably supported in the housing;
two rotors, comprising rotating disks rotatable integrally with said rotating shaft around said rotating shaft as a central axis, and permanent magnets arranged concentrically around said rotating shaft in spaced relation to each other on at least one side of surfaces of the rotating disks, wherein the surfaces having the permanent magnets face each other in spaced relation to each other; and
a stator that is fixed to said housing so as to be arranged between said pair of rotors facing each other, and spaced therefrom, the stator having coils disposed concentrically in spaced relation to each other;
wherein magnetic flux generated from the permanent magnets of said rotors intermittently penetrates interiors of said coils disposed concentrically around said rotating shaft as it rotates, and
wherein said rotating disk has concave portions formed at a surface facing said stator and the permanent magnets are disposed in the concave portions so as to protrude above the surface of said rotating disk;
wherein a reinforcing member is provided on a surface of said rotating disk so as to support a side surface of said protruding portions of the permanent magnets, said reinforcing member being made of a non-magnetic material and having a through-hole provided at locations corresponding to the respective locations of the permanent magnets disposed on said rotating disk; and
wherein said reinforcing member has a thickness such that a top surface of the reinforcing member is level with or below a top face of the permanent magnets of the rotating disk which are in the respective through-hole.

6. The axial gap type rotating machine according to claim 1, wherein said protruding portion of the permanent magnet is ¼ to ¾ of a thickness of the magnets.

7. The axial gap type rotating machine according to claim 1, wherein any said rotating disk is magnetic and disk-shaped.

8. The axial gap type rotating machine according to claim 3, wherein concave portions are formed on a surface of said end rotating disk facing said stator and on a circumference of a circle opposite to a circumference of the concentric circle on which the coils of said stator are arranged, and wherein the permanent magnets are disposed in the concave portions so as to protrude above the surface of said end rotating disk.

* * * * *